United States Patent

Furukawa et al.

[11] Patent Number: 5,959,038
[45] Date of Patent: Sep. 28, 1999

[54] THERMOSETTING RESIN COMPOSITION AND ARTICLES MOLDED THEREFROM

[75] Inventors: Haruhiko Furukawa; Yoshitsugu Morita; Toshio Saruyama; Makoto Yoshitake, all of Chiba, Japan

[73] Assignee: Dow Corning Toray Silicone Co., Ltd., Tokyo, Japan

[21] Appl. No.: 08/865,542

[22] Filed: May 29, 1997

[30] Foreign Application Priority Data

May 30, 1996 [JP] Japan ................................. 8-158845

[51] Int. Cl.⁶ .................................................. C08L 27/10
[52] U.S. Cl. .......................... 525/209; 525/116; 525/169
[58] Field of Search ............................ 524/264; 525/116, 525/169, 209

[56] References Cited

U.S. PATENT DOCUMENTS

| | | | |
|---|---|---|---|
| 4,190,686 | 2/1980 | Muis | 523/458 |
| 4,225,554 | 9/1980 | Kaplan | 264/328.2 |
| 4,766,163 | 8/1988 | Strudwick | 523/509 |
| 4,853,434 | 8/1989 | Block | 525/100 |
| 4,877,837 | 10/1989 | Reising | 524/14 |
| 4,879,344 | 11/1989 | Woo | 524/431 |
| 4,968,751 | 11/1990 | Miles | 524/355 |
| 5,780,530 | 7/1998 | Mizutani | 523/209 |

FOREIGN PATENT DOCUMENTS

| | | |
|---|---|---|
| 49-99383 | 9/1974 | Japan . |
| 51-42750 | 4/1976 | Japan . |
| 57-194243 | 11/1982 | Japan . |
| 60-104113 | 6/1985 | Japan . |
| 63-295674 | 12/1988 | Japan . |
| 64-81850 | 3/1989 | Japan . |
| 4-93363 | 3/1992 | Japan . |
| 4-275316 | 9/1992 | Japan . |

*Primary Examiner*—Paul R. Michl
*Attorney, Agent, or Firm*—Timothy J. Troy

[57] ABSTRACT

A thermosetting resin composition, comprising: a thermosetting organic resin (A), and an organopolysiloxane (B) represented by the following average unit formula: $R_aSiO_{(4-a)/2}$ wherein R is a selected from the group consisting of substituted or unsubstituted monovalent hydrocarbon groups, acryl-containing organic groups, methacryl-containing organic groups, and an alkoxy groups. The curable compositions of the invention exhibit excellent mold release characteristics and can be utilized to produce articles having water-repellent characteristics.

16 Claims, No Drawings

THERMOSETTING RESIN COMPOSITION AND ARTICLES MOLDED THEREFROM

FIELD OF THE INVENTION

The present invention relates generally to a thermosetting resin composition and articles molded therefrom. In particular the thermosetting resin composition of the invention possesses excellent moldability and molded articles produced therefrom have improved mold-release properties and water-repellent properties.

DESCRIPTION OF THE PRIOR ART

Thermosetting resins are characterized by excellent moldability, thermal and electrical resistant properties, and high mechanical strength. Therefore they find wide application in various fields. Known resins of the aforementioned type include, for example, unsaturated polyester resins, acrylic resins, diallylphthalate resins, phenol resins, urea resins, and epoxy resins. Among these, the unsaturated polyester resins, acrylic resins, and diallylphthalate resins possess either excellent arc resistance and tracking resistance and therefore are used for manufacturing electronic and electrical parts, or improved mechanical properties, moldability, and low-cost characteristics and therefore are used for manufacturing plate-like molded articles as construction materials; or find application for manufacturing parts in automotive and shipbuilding industry, or for processing baths, purification baths, or as materials for household applications. Furthermore, the aforementioned resins find extremely wide application in the production of coating materials, decorative plates, or artificial marble.

In some fields, however, the application of the aforementioned resins is limited because of poor mold-release properties, low resistance to moisture, low chemical resistance and low resistance to contamination. Many proposals have been made to improve the above properties of the resins either by combining them with organic waxes or metal salts of fatty carboxylic acids, or by utilizing unsaturated polyester resin compositions mixed with a dimethyl polysiloxane or a similar linear-chain organopolysiloxane (see Japanese Laid-Open Patent Applications Kokai 57-184243, Kokai 60-104113, and Kokai 64-81850). In some instances, such additives have been found to be short acting. In other instances, seepage of the additive from the resin matrix during molding has caused contamination of the mold resulting in unattractive appearance or a surface texture on the molded articles.

It has been also proposed to use an unsaturated polyester resin composition in combination with solid powdered silicone resins or resin-like organopolysiloxanes having siloxane units represented by the following formula: $SiO_{4/2}$ (see Japanese Laid-Open Patent Applications Kokai 49-99383 and Kokai 51-42750). However, the aforementioned organopolysiloxanes do not have acrylic groups or methacrylic groups, and therefore, even though the solid powdered silicone resins are incorporated, the separation of molded articles from the mold is not improved. Furthermore, when the resin-like organopolysiloxanes having $SiO_{4/2}$ units are used, it becomes difficult to preserve the effect of the additives over a long period of time.

It is known that organopolysiloxanes having acrylic groups or methacrylic groups can be used as additives to synthetic resins (see Japanese Laid-Open Patent Application Kokai 63-295674 and Kokai 4-93363). Also known are diallylphalate compositions formed with an addition of the aforementioned organopolysiloxanes (see Japanese Laid-Open Patent Application Kokai 4-275316). However, these organopolysiloxanes have a linear-chain molecular structure, and even though such organopolysiloxanes are used, it is not possible to completely protect the surface of the molded articles from seepage of the additives. Thus, the problems of surface defects on molded articles and mold contamination remain unsolved.

SUMMARY OF THE INVENTION t is therefore an object of the present invention to provide a thermosetting resin composition which possesses excellent moldability and is suitable for molding articles which in a cured state demonstrate improved mold-release properties and water-repellent properties.

The present invention provides a thermosetting resin composition that comprises:

(A) 100 parts by weight of a thermosetting organic resin;
(B) 0.1 to 200 parts by weight of organopolysiloxane represented by the following average unit formula: $R_aSiO_{(4-a)/2}$, wherein R is a selected from the group consisting of substituted or unsubstituted monovalent hydrocarbon groups, acryl-containing organic groups, methacryl-containing organic groups, and alkoxy groups, with the provisos that: at least 80 mole % of the aforementioned R groups are in the form of the substituted or unsubstituted monovalent hydrocarbon groups; at least 2 mole % of the R groups are in the form of the acryl-containing organic groups or methacryl-containing organic groups, "a" is a number within the range of 0.75 to 2.5), said organopolysiloxane having at least one siloxane unit represented by formula: $SiO_{4/2}$ or a siloxane unit represented by formula: $RSiO_{3/2}$.

DETAILED DESCRIPTION OF THE INVENTION

A main component of the composition of the present invention is a thermosetting organic resin which constitutes component (A). The following are examples of such resins: unsaturated polyester resin, acrylic resin, diallylphthalate resin, vinylester resin, phenol resin, urea resin, melamine resin, guanamine resin, phenolfurfural resin or similar furane-type resins, epoxy resin, polyurethane resin, toluene resin, alkyd resin, phenol-modified xylene resin, rosin resin-modified xylene resin, or similar xylene resins. Preferable among these are unsaturated polyester resin, acrylic resin, diallylphthalate resin, vinylester resin, or similar thermosettable organic resins obtained as a result of a radical reaction. Especially preferable are unsaturated polyester resin, acrylic resin, and diallylphthalate resin.

An unsaturated polyester resin used as component (A) of the invention may be in the form of an ester polymer obtained by subjecting an unsaturated dibasic acid and a polyhydric alcohol, and if necessary, with an addition of a saturated dibasic acid, to condensation polymerization. It may also be in the form of a resin obtained by adding styrene or a similar unsaturated monomer to the aforementioned ester polymer with subsequent curing due to an addition of a hardening agent or a radical reaction generated by heating. The unsaturated dibasic acid may be in the form of an anhydrous maleic acid, fumaric acid, itaconic acid, citraconic acid, or a similar substituted or unsubstituted aliphatic unsaturated dibasic acid, or anhydrides of the above acids. The following are examples of polyhydric alcohols suitable for the above purpose: ethylene glycol, propylene glycol, diethylene glycol, triethylene glycol, 1,3-butylene glycol, 2,3-butylene glycol, 1,4-butylene glycol, or the like. The saturated dibasic acid may be represented by an anhydrous phthalic acid, isophthalic acid, anhydrous tetrachlorophthalic acid, haxachloroendomethylene tetrahydrophthalic acid, dimethylene tetrahydrophthalic acid or a similar substituted or unsubstituted aromatic saturated dibasic acid or anhydrides thereof, as well as succinic acid, adipic acid, sebacic acid, or a similar substituted or unsubstituted aliphatic saturated dibasic acid. The unsaturated monomer may be the one having an unsaturated group reactive with respect to an unsaturated polyester resin such as a stearic acid, tert-butylstyrene, divinyl benzene, vinyl toluene, diallylphthalate, triallylcyanurate, ester acrylate, or a similar unsaturated polyester resin. It may also be a partial polymer of the aforementioned monomers. By selecting different starting materials and component ratios, it becomes possible to some extent to adjust the properties of the resin obtained after curing. For example, if triallyldianurate is used as the unsaturated monomer, an unsaturated polyester resin is obtained with improved resistance to heart, and if an itaconic acid is used as the unsaturated dibasic acid, an unsaturated polyester resin is obtained with excellent chemical resistance.

The acrylic resin which is used as a component of the present invention may be represented by one or two, or more types of vinyl carboxylic acid ester monomers, or a mixture thereof with one or two, or more types of polymerizable unsaturated monomers. The aforementioned resin may acquire curable properties by adding a hardening agent or by a radical reaction caused by heating. The vinylcarboxylic acid ester monomer may be represented by a monohydric alcohol or a monohydric phenol, or by acrylic acid or methacrylic acid ester, e.g., methyl methacrylate, ethyl methacrylate, propyl methacrylate, butyl methacrylate, phenyl methacrylate, allyl methacrylate, methylacrylate, ethylacrylate, propylacrylate, butylacrylate, phenylacrylate, and allylacrylate. There are no special limitations with regard to the use of unsaturated monomers other than vinyl carboxylic acid ester monomers. They may be in the form of polymers or copolymers with vinyl carboxylic acid ester monomers or with other unsaturated monomers. Prefered, however, are the following compounds: monoesters of dihydric alcohols and acrylic acid or methacrylic acid; an acrylic acid, methacrylic acid, acrylonitrile, methacrylonitrile, acrylamide, styrene, α-methyl styrene, vinyl acetate, vinyl chloride, vinylidene chloride, vinylidene fluoride, ethylene, anhydrous maleic acid, maleic acid, fumaric acid, butadiene, glycidyl methacrylate, or similar monofunctional unsaturated monomers of an acrylic acid or methacrylic acid, ethylene glycol, polyethylene glycol, propylene glycol, polypropylene glycol, 1,3-butadiol, neopentyl glycol, 1,6-hexadiol, tetramethylol methane, dimethylol ethane, trimethylol ethane, dimethylol propane, trimethylol propane, pentaerythritol, dipentaerythritol, or similar polyhydric esters of polyhydric alcohols; divinyl benzene, triallyl isocyanurate, or similar polyfunctional unsaturated monomers. If the acrylic resin component of the invention is a mixture of a vinyl carboxylic acid ester monomer with an unsaturated monomer, there are no special limitations with regard to their types and mixture ratios. If, however, the composition of the invention is intended for manufacturing artificial marble, for obtaining improved weather-resistant properties and texture, it is recommended, however, that methacrylate be the main component of the acrylic resin. In the case of compounding with polyfunctional unsaturated monomers, it is recommended that the latter be contained in the acrylic resin in an amount of 0.2 to 25 wt. %.

The invention is not limited to the use of only one type of polymer formed from vinylcarboxylic acid ester monomer or other unsaturated monomer. A mixture of two or more polymers having different compositions and molecular weight distributions may be used. Furthermore, the vinylcarboxylic acid ester monomer or other unsaturated monomer may be used with a syrup that contains a partially dissolved polymer obtained by preliminarily polymerizing the aforementioned monomers. Although there are no special limitations with regard to a method of preparation of the syrup, it is recommended that, after polymerizing a part of the aforementioned vinylcarboxylic acid ester monomer or other unsaturated monomer, the polymer be dissolved in the remaining vinylcarboxylic acid ester monomer or aforementioned other unsaturated monomer, or that the aforementioned vinylcarboxylic acid ester monomer or another unsaturated monomer be partially polymerized.

When diallylphthalate resin constitutes a component of the present invention, it may be prepared from a diallylphthalate monomer obtained by esterifying an anhydrous phthalic acid and an alcohol such as an allyl alcohol, whereby a resin suitable for curing from the addition of a hardening agent or a radical reaction caused by heating is obtained. Such diallylphthalate resin may be combined with the aforementioned unsaturated polyester resin and acrylic resin.

In order to improve storage stability, the aforementioned unsaturated polyester resin, acrylic resin, and diallylphthalate resin when used as components of the present invention, can be combined with hydroquinones, quinones, p-tert-butylcatechol or similar phenols or other polymerization inhibitors. Furthermore, these resins can be used for manufacture of reinforced or non-reinforced articles. The following are examples of fillers that are suitable for reinforcement: glass fibers, metal whiskers, carbon fibers, Kevlar fiber, polyester fibers, polyamide fibers, or similar reinforcing materials; calcium silicate, calcium carbonate, aluminum hydroxide, magnesium hydroxide, calcium hydroxide, silica, talc, mica, clay, titanium oxide, glass, beads, and the like.

Certain organopolysiloxanes are suitable for use as component (B) of the present invention and are used to impart such properties as improved moldability, mold release properties after cure, water repelling properties, and the like. The above-mentioned organopolysiloxanes are represented by the following average unit formula: $R_aSiO_{(4a-2)/2}$ and contain, at least one siloxane unit represented by the following formula: $SiO_{4/2}$ or a siloxane unit represented by the following formula: $SO_{3/2}$, where R is selected from the group consisting of a substituted or unsubstituted monovalent hydrocarbon groups, an acryl-containing organic groups, methacryl-containing organic group, or an alkoxy group. The aforementioned substituted or unsubstituted monovalent hydrocarbon groups may be represented by the following: methyl group, ethyl group, propyl group, butyl group, methyl group, isopropyl group, isobutyl group, cyclopentyl group, cyclohexyl or a similar alkyl group; vinyl group, allyl group, hexenyl group or a similar alkenyl group; phenyl group, naphthyl group or a similar aryl group; benzyl group, 1-phenylethyl group or a similar aralkyl group, chloromethyl group, 3-chloropropyl group, 3,3,3-trifluoropropyl group, nonafluorobutylethyl group a similar halogenated alkyl group; 4-chlorophenyl group, 3,5-dichlorophenyl group, 3,5-difluorophenyl group or a similar halogenated aryl group; 4-chloromethylphenyl group, 4-trifluoromethylphenyl group or a similar halogenated alkyl group-substituted aryl group. The methyl group is preferred among these. An acryl-containing organic group may be represented by acryloxymethyl group, 3-acryloxypropyl group, 3-acrylamidepropyl group, whereas a methacryl-containing organic group may be represented by methacryloxymethyl group and 3-methacryloxypropyl group. It is preferred that an acryloxyalkyl or a methacryloxyalkyl group represented by the following formula be used:

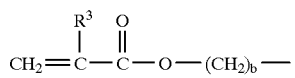

wherein $R^3$ is a hydrogen atom or a methyl group and b is an integer from 1 to 6.

As previously mentioned, organopolysiloxanes suitable as component (B) are represented by the following average unit formula: $R_aSiO_{(4a-2)/2}$ When R is an alkoxy group, it can be exemplified by a methoxy group, ethoxy group, propoxy group, butoxy group, and isopropoxy group. Methoxy or ethoxy groups are preferred. It is required that at least 80 mole % of the aforementioned R groups be in the form of substituted or unsubstituted monovalent hydrocarbon groups.

It is required that at least 85 mole % of the R groups be in the form of substituted or unsubstituted monovalent hydrocarbon groups. It is also required that at least 2 mole % of the R groups be in the form of acryl-containing organic groups or methacryl-containing organic groups. It is preferred that the above acryl-containing organic groups or methacryl-containing organic groups represent from 2 to 15 mole % of the R groups. It is also recommended that at least 2 more %, more preferably from 2 to 10 mole %, of the R groups be in the form of alkoxy groups; and that "a" is a number between 0.75 and 2.5.

The organopolysiloxane component (B) contains, must include units represented by the formula: $SO_{4/2}$ (Q units) or units represented by the formula: $RSiO_{3/2}$ (T units), wherein R is the same as defined above. Apart from the siloxane units described above, the aforementioned organopolysiloxane may also contains siloxane units represented by the formula $R_3SiO_{1/2}$ (M units, wherein R is the same as defined above) or a siloxane units represented by the formula $R_2SiO_{2/2}$ (D units, wherein R is again the same as defined above).

The organopolysiloxane component (B) that contains Q units or T units in its molecule is known as a conventional silicone resin; the molecular structures of this component that contain M units and Q units is known as MQ resins; the component containing M units, D units, and Q units is known as an MDQ resin; the component that contains M units, T units and Q units is known as an MTQ resin; the component that contains D unit and T unit is known as a DT resin, and the component that contains only T unit is known as a T resin.

It is recommended that the aforementioned component be represented by an organopolysiloxane of the following average composition formula:

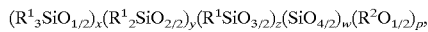

In this formula $R^1$ is a group selected from the group consisting of a substituted or unsubstituted monovalent hydrocarbon groups, acryl-containing organic groups, and methacryl-containing organic groups, $R^2$ is an alkyl group such as a methyl group, ethyl group, propyl group, butyl group, and isopropyl group. The methyl group or ethyl group are preferable. Among these, methyl or ethyl group are preferable; x, y and z, w and p are numbers meeting the following conditions: x/w=0.4 to 1.5, y/w=0 to 1, z/y=0 to 1, p/w=0.05 to 1.0.

The organopolysiloxane component can be prepared by subjecting an organoalkoxysilane, that has acryl-containing organic groups or methacryl-containing organic groups, and an organoalkoxysilane such as tetramethoxysilane and 3-methylmethoxysilane, that does not contain acryl-containing groups or methacryl-containing groups, to co-hydrolysis in the presence of an acidic or basic catalyst.

The aforementioned component of the invention is used in an amount of 0.1 to 200 parts by weight, preferable from 0.1 to 100 parts by weight per total parts by weight of component (A).

The organopolysiloxane that is used as the aforementioned component (B) may be represented by the formula given below, where A represents 3-methacryloxypropyl group and $A^1$ represents 3-acryloxypropyl group:

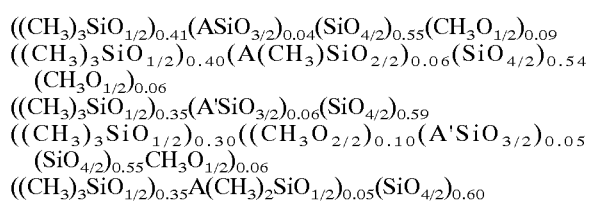

The composition of the present invention is prepared by uniformly mixing the aforementioned components (A) and (B). In addition to these components, the composition of the invention may be combined with an organic wax, metal salts of an aliphatic carboxylic acid or a similar mold release agents, acrylsilane or similar coupling agents, dyes, and the like, provided they do not interfere with the object of the invention.

The thermosetting resin composition of the present invention may be used for molding various articles by adding a hardening catalyst and, if necessary, reaction accelerators, and by curing the resulting composition. Such hardening catalysts and reaction accelerators initiate and accelerate the cross-linking reaction of the unsaturated groups available in the aforementioned components (A) and (B). The hardening catalyst may be represented by acyl peroxide, ketone peroxide, dialkyl peroxide, hydroperoxide or similar organic peroxides, azo bis-butilonitrile or similar organic azo compounds or other radical-polymerization catalysts. It is recommended that the reaction accelerators be in the form of compounds that facilitate development of radicals under the effect of the aforementioned organic peroxides. They may be represented by a cobalt organic acid salt, vanadium organic acid salt, manganese organic acid salt, and tertiary amino compounds. It is preferred that the reaction accelerators be suitable for use of the compounds of the invention at low temperatures.

Because the thermosetting composition of the present invention has excellent moldability, it is preferred that this composition be used as a thermosetting resin composition for molding.

The following explanation will deal with articles molded from the thermosetting resin composition of the present invention.

The molded articles, according to the invention, are obtained by curing the aforementioned composition of the present invention. There are no special limitations with regard to the curing conditions and procedures, but, in general, it should be a method based on cross-linking and curing to a desired form with the use of a mold or the like. For example, such articles may be molded with heating under pressure or by using a low-temperature molding procedure known as cold pressing. In the method based on heating under pressure, the composition of the invention, which is known as a hand lay-up or spray lay-up under normal pressure, is loaded into a mold and then heated and cured. Alternately, it can be used in the injection molding procedure utilizing transfer press equipment, with heating and compression. It may be used for a continuous lamination molding process, continuous drawing process also known as protrusion, continuous molding by the so called filament winding method, and the like. In these molding procedures, an intermediate molding material can be used which is premixed from the aforementioned component (A), component (B), and the aforementioned fillers. Such an intermediate molding material can be in the form of sheets also known as SMC (sheet molding compound) and solid or liquid intermediate materials known as BMC (BERK molding compounds), or a premix compound. The intermediate molding material may be in the form of prepreg which is glass cloth or mat impregnated with the composition according to the invention.

Articles molded from the aforementioned thermosetting resin composition of the present invention possess excellent mold release properties, water repelling properties, and anticontamination properties. Another advantage of molded articles of the above type is that component (b), which is an organopolysiloxane, does not seep through to the surface of the molded article. Articles molded according to the invention are especially advantageous for use as kitchen ceiling panels, various countertops, decorative lining for washstands, shower trays, waterproof pans, for floor, partition items, and other panels which are used as artificial marble products.

EXAMPLES

The invention will be further described in greater detailed with reference to practical examples. In the subsequent practical and comparative examples, all parts are parts by weight, and viscosity is as measured at 25° C.

Reference Example 1

A 500 ml four-neck flask having a stirrer, thermometer, an inert gas supply pipe, and a condenser was filled with 78 g of anhydrous maleic acid, 178 g of phthalic acid, and 167 g of propylene glycol, and, after mixing these components, nitrogen gas was caused to flow through the flask at a rate 100 ml per minutes under gradual heating of the flask contents. After one hour, the temperature was raised to 150 to 160° C., and the reaction continued for about one hour at this temperature. After one hour, the contents of the flask was heated to 210° C. to cause the reaction. The reaction solution was sampled at regular intervals, and heating was stopped at the moment the acid number was 40. The reaction mixture was then cooled to 140° C. The reaction solution was combined with 0.06 g of hydroxyquinone that was dissolved, and the reaction mixture was then transferred to a 1 l beaker. Styrene was uniformly admixed to the contents to an amount of 30 wt. %. As a result, 440 g of a styrene solution of unsaturated polyester were obtained.

Practical Example 1

A beaker was filled with: 30 parts of a 30% styrene solution of the unsaturated polyester obtained in Reference Example 1; 5 parts of organopolysiloxane represented by the following average unit formula $(CH_3)_{1.23}(Z)_{0.04}(CH_3O)_{0.09}SiO_{1.32}$ (where Z was a 3-methacryloxypropyl group) and by the following average composition formula: $((CH_3)_3SiO_{1/2})_{0.41}(ZSiO_{3/2})_{0.04}(SiO_{4/2})_{0.55}(CH_3O_{1/2})_{0.09}$ (where Z was the same as defined above); 15 parts of glass fiber; 50 parts of calcium carbonate powder; 1 part of benzoyl peroxide paste (50% of effective component); and 0.5 parts of dimethyl aniline. The components were uniformly stirred. As a result, an unsaturated polyester resin composition was prepared. The obtained unsaturated polyester resin composition was poured into a stainless steel mold where it was kept for 3 hours at room temperature and then heated in an oven for 2 hours at 110° C. After cooling, the product was removed from the mold in the form of a molded article made from the unsaturated polyester resin. In the aforementioned operation, the product was visually inspected with regard to mold-release properties and contamination of the surface of the mold after the removal of the molded article. The mold-release properties were evaluated based on the ease of removal of the molded article from the mold. Furthermore, the molded article was evaluated with regard to its appearance, and then a contact angle of the material of the article with water was measured with a contact-angle measurement instrument (the product of Kyowakaimen Kagaku Co.; Mod. CA-P). The results are shown in Table 1.

Practical Example 2

An unsaturated polyester resin composition was prepared in the same manner as in Practical Example 1, with the exception that the 30% styrene solution of the unsaturated polyester was used in an amount of 28 parts, the organopolysiloxane was used in an amount of 10 parts, the glass fibers were used in an amount of 14 parts, and the calcium carbonate powder was used in an amount of 48 parts. The obtained unsaturated polyester resin composition was molded in the same manner as in Practical Example 1 and was evaluated with regard to mold-release properties, mold contamination, appearance, and contact angle with water. The results are shown in Table 1.

Practical Example 3

An unsaturated polyester resin composition was prepared in the same manner as in Practical Example 1, with the exception that the organopolysiloxane was represented by the following average unit formula $(CH_3)_{1.26}(Z)_{0.06}(CH_3O)_{0.06}SiO_{1.31}$ (where Z was a 3-methacryloxypropyl group) and by the following average composition formula: $(CH_3)_3SiO_{1/2})_{0.40}(Z(CH_3)SiO_{2/2})_{0.06}(SiO_{4/2})_{0.54}(CH_3O_{1/2})_{0.06}$ (where Z was the same as defined above). The unsaturated polyester resin composition so-obtained was molded in the same manner as in Practical Example 1 and was evaluated with regard to mold-release properties, mold contamination, appearance, and contact angle with water. The results are shown in Table 1.

Practical Example 4

A syrup was prepared by dissolving 7 parts of a methacrylic resin (the product of Kurare Co., Ltd.; trademark "Parabeeds") in a mixture consisting of 30 parts of methyl methacrylate and 2 parts of trimethylol-propane trimethacrylate. The syrup so-obtained was combined with 5 parts of an organopolysiloxane represented by the following average unit formula $(CH_3)_{1.23}(Z)_{0.04}(CH_3O)_{0.09}SiO_{1.32}$ (where Z was a 3-methacryloxypropyl group) and by the following average composition formula: $((CH_3)_3SiO_{1/2})_{0.41}(ZSiO_{3/2})_{0.04}(SiO_{4/2})_{0.55}(CH_3O_{1/2})_{0.09}$ (where Z was the same as defined above); 0.02 parts of 2,2'-azo-bis-butylonitrile; 0.1 parts of 2,2-bis (tert-butylperoxy), and 56 parts of powdered aluminum hydroxide (a product of Showa Denko Co., Ltd.; trademark Hidirite H-310). The components were uniformly mixed. As a result, an acrylic resin composition was obtained. The acrylic resin composition so-obtained was poured into a stainless steel mold where it was heated for 4 hours at 60° C. and then for an additional 2 hours at 120° C. After cooling, the product was removed from the mold in the form of a molded article made of the acrylic resin. In the aforementioned operation, the product was visually inspected with regard to mold-release properties and contamination of the surface of the mold after the removal of the molded article. The mold-release properties were evaluated based on the ease of removal of the molded article from the mold. Furthermore, the molded article was evaluated with regard to its appearance, and then a contact angle of the material of the article with water was measured with a contact-angle measurement instrument (the product of Kyowakaimen Kagaku Co.; Mod. CA-P). The results are shown in Table 1.

Practical Example 5

A mixture composed of 45 parts of diallyl-orthophthalate prepolymer (a product available from Daiso Co., Ltd.), 5 parts of organopolysiloxane represented by the following average unit formula $(CH_3)_{1.23}(Z)_{0.04}(CH_3O)_{0.09}SiO_{1.32}$ (where Z was a 3-methacryloxypropyl group) and by the following average composition formula: $(CH_3)_3(SiO_{1/2})_{0.41}$ $(ZSiO_{3/2})_{0.04}(SiO_{4/2})_{0.55}(CH_3O_{1/2})_{0.09}$ (where Z was the same as defined above); 40 parts of glass fibers, 10 parts of powdered calcium carbonate, and 1.5 parts of dicumene peroxide was kneaded between two rolls and then molded in a transfer-type molding machine. The temperature of the mold was 180° C. After cooling, the product was removed from the mold in the form of a molded article made of the diallylphthalate resin. In the aforementioned operation, the product was visually inspected with regard to mold-release properties and contamination of the surface of the mold after the removal of the molded article. The mold-release properties were evaluated based on the ease of removal of the molded article from the mold. Furthermore, the molded article was evaluated with regard to its appearance, and then a contact angle of the material of the article with water was measured with a contact-angle measurement instrument (a product of Kyowakaimen Kagaku Co.; Mod. CA-P). The results are shown in Table 1.

Comparative Example 1

An unsaturated polyester resin composition was prepared in the same manner as in Practical Example 1, with the exception that the organopolysiloxane was not used. The unsaturated polyester so-obtained was molded in the same manner as in Practical Example 1, and the molded article was evaluated with regard to mold-release properties, mold contamination, appearance, and a contact angle with water. The results are shown in Table 1.

Comparative Example 2

An unsaturated polyester resin composition was prepared in the same manner as in Practical Example 1, with the exception that the organopolysiloxane was represented by a dimethylpolysiloxane having a 100 centistoke viscosity and both terminals of the molecule closed with trimethylsiloxy groups. The unsaturated polyester so-obtained was molded in the same manner as in Practical Example 1, and the molded article was evaluated with regard to mold-release properties, mold contamination, appearance, and a contact angle with water. The results are shown in Table 1.

Comparative Example 3

An unsaturated polyester resin composition was prepared in the same manner as in Practical Example 1, with the exception that the organopolysiloxane was replaced by the one having viscosity of 25 centistokes and represented by the following average composition formula:

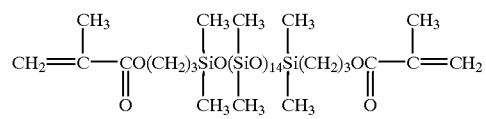

The unsaturated polyester so-obtained was molded in the same manner as in Practical Example 1, and the molded article was evaluated with regard to mold-release properties, mold contamination, appearance, and a contact angle with water. The results are shown in Table 1.

Comparative Example 4

An unsaturated polyester resin composition was prepared in the same manner as in Practical Example 1, with the exception that the organopolysiloxane was represented by the one having the following average unit formula: $(CH_3)_{1.26}SiO_{1.37}$ and by the following average composition formula: $((CH_3)_3SiO_{1/2})_{0.42}(SiO_{4/2})_{0.58}$. The unsaturated polyester so-obtained was molded in the same manner as in Practical Example 1, and the molded article was evaluated with regard to mold-release properties, mold contamination, appearance, and a contact angle with water. The results are shown in Table 1.

TABLE 1

|  | Mold-Release Properties | Mold contamination | Appearance of the molded article | Contact angle with water (degrees) |
|---|---|---|---|---|
| Practical Ex. 1 | Good | None | Good | 105 |
| Practical Ex. 2 | Good | None | Good | 105 |
| Practical Ex. 3 | Good | None | Good | 105 |
| Practical Ex. 4 | Good | None | Good | 104 |
| Practical Ex. 5 | Good | None | Good | 105 |
| Comp. Ex. 1 | Unsatisf. | None | Good | 81 |
| Comp. Ex. 2 | Good | Contaminated | Sticky surface | 105 |
| Comp. Ex. 3 | Good | Contaminated | Sticky surface | 105 |
| Comp. Ex. 4 | Good | Contaminated | Sticky surface | 104 |

What is claimed is:

1. A thermosetting resin composition, comprising:
   (A) 100 parts by weight of a thermosetting organic resin;
   (B) 0.1 to 200 parts by weight of organopolysiloxane represented by average unit formula: $R_aSiO_{(4-a)/2}$, wherein each R is independently selected from the group consisting of substituted or unsubstituted monovalent hydrocarbon groups, acryl-containing organic groups, methacryl-containing organic groups, and alkoxy groups, with the provisos that at least 80 mole % of the R groups are in the form of the substituted or unsubstituted monovalent hydrocarbon groups, at least 2 mole % of the R groups are in the form of the acryl-containing organic groups or methacryl-containing organic groups, a is a number within the range of 0.75 to 2.5, and said organopolysiloxane having at least one siloxane unit selected from the group consisting of siloxane units represented by formula: $SiO_{4/2}$ and siloxane units represented by formula: $RSiO_{3/2}$.

2. The thermosetting resin composition of claim 1, wherein component (A) is selected from the group consisting of unsaturated polyester resins, acrylic resins, and diallylphthalate resins.

3. The thermosetting resin composition of claim 1, wherein said component (B) is an organopolysiloxane represented of the following average composition formula:

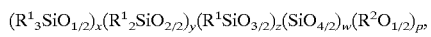

$$(R^1{}_3SiO_{1/2})_x(R^1{}_2SiO_{2/2})_y(R^1SiO_{3/2})_z(SiO_{4/2})_w(R^2O_{1/2})_p,$$

where $R^1$ is selected from the group consisting of a substituted or unsubstituted monovalent hydrocarbon groups, acryl-containing organic groups, and a methacryl-containing organic groups, $R^2$ is an alkyl group; and x, y, z, w, and p are numbers which satisfy the following conditions: {x/w=0.4 to 1.5, y/w=0 to 1, z/w=0 to 1, p/w=0.05 to 1.0}.

4. A molded article made by curing the thermosetting resin composition of claim 1.

5. The thermosetting resin composition of claim 1, further comprising a mold release agent.

6. The thermosetting resin composition of claim 5, wherein the mold release agent is selected from the group consisting of an organic wax and metal salts of an aliphatic carboxylic acid.

7. The thermosetting resin composition of claim 1, further comprising a coupling agent.

8. The thermosetting resin composition of claim 7, wherein the coupling agent is an acrylsilane.

9. The thermosetting composition of claim 1, further comprising a dye.

10. The thermosetting resin composition of claim 1, further comprising a radical polymerization catalyst.

11. The thermosetting resin composition of claim 10, wherein the radical polymerization catalyst is selected from the group consisting of organic peroxides and organic azo-compounds.

12. The thermosetting resin composition of claim 11, wherein the organic peroxide is selected from the group consisting of acyl peroxide, ketone peroxide, dialkyl peroxide, and hydroperoxide.

13. The thermosetting resin composition of claim 12, further comprising a reaction accelerator.

14. The thermosetting resin composition of claim 13, wherein the reaction accelerator is selected from the group consisting of a cobalt organic acid salt, vanadium organic acid salt, manganese organic acid salt, and tertiary amino compounds.

15. The thermosetting resin composition of claim 11, wherein the organic azo-compound is azo bis-butilonitrile.

16. The thermosetting resin composition of claim 1, wherein at least 2 mole % of the R groups in component (B) are alkoxy groups.

* * * * *